(12) United States Patent
Matsubara et al.

(10) Patent No.: US 6,566,836 B2
(45) Date of Patent: May 20, 2003

(54) CONTROLLER FOR CONTROLLING SERVO MOTOR AND SPINDLE MOTOR

(75) Inventors: Shunsuke Matsubara, Yamanashi (JP); Yasusuke Iwashita, Yamanashi (JP); Tadashi Okita, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 72 days.

(21) Appl. No.: 09/968,508

(22) Filed: Oct. 2, 2001

(65) Prior Publication Data

US 2002/0043944 A1 Apr. 18, 2002

(30) Foreign Application Priority Data

Oct. 17, 2000 (JP) ........................................ 2000-316932

(51) Int. Cl.$^7$ .............................................. G05B 19/29
(52) U.S. Cl. ........................... 318/600; 318/34; 700/169
(58) Field of Search ............................... 318/34, 38, 39, 318/85, 571, 573, 574, 600, 625; 700/186, 187, 169

(56) References Cited

U.S. PATENT DOCUMENTS 4,079,235 A * 3/1978 Froyd et al. ................. 318/571
4,310,878 A * 1/1982 Hyatt ........................... 318/608

FOREIGN PATENT DOCUMENTS

| JP | 4-177408 A | 6/1992 |
| JP | 11-45106 A | 2/1999 |
| JP | 11-143514 A | 5/1999 |

* cited by examiner

Primary Examiner—Khanh Dang
(74) Attorney, Agent, or Firm—Staas & Halsey LLP

(57) ABSTRACT

In a controller where a contour machining is performed through a synchronous control between a mechanically movable portion (servo axis) driven by a servo motor and a main shaft (spindle axis) driven by a spindle motor, the position of the servo axis and the position of the spindle axis are collected at the same timing for each predetermined cycle and are stored. The position data of the servo axis and the spindle axis stored are converted to obtain a machining contour shape data, and the shape obtained is displayed on a display device of a personal computer or the like.

6 Claims, 5 Drawing Sheets

CONTROLLER FOR CONTROLLING SERVO MOTOR AND SPINDLE MOTOR

BACKGROUND OF THE INVENTION

1. Field of the Invention

The present invention relates to a controller for machining a contour shape by controlling a servo motor and a motor (spindle motor) driving a main shaft in a synchronous manner.

2. Description of the Prior Art

In order to allow a machine tool to perform machining at a high speed and with a high accuracy according to a controller, it is required to make severe adjustment of various control parameters such as a speed loop gain, a position loop gain, an acceleration/deceleration time constant and the like to a servo motor which is a driving source for a machine tool or a motor for a main shaft driving (hereinafter, referred to as a spindle motor).

As a adjusting method of control parameters, such a method of trial and error has been employed that an actual machining is performed, the control parameters are adjusted based on the results of measurement/evaluation of the contour shape obtained by the actual machining, and a machining is performed again to repeat adjustment of the control parameters based on the result of measurement/evaluation of the contour shape thus obtained so that optimal parameter values are obtained.

Also, conventionally, as means for measuring the machined result, a technique of measuring, displaying and evaluating a contour shape using positional feedback data from a servo motor has been disclosed in Japanese Patent Application Laid-Open No. 4-177408 and the like. Also, evaluation using feedback signals from a detector provided on a spindle motor has been performed.

However, control parameters, set when a contour shape machining is conducted in a synchronously controlling manner of a mechanically movable portion (hereinafter, referred to as "servo axis") driven by a servo motor and a main shaft (hereinafter, referred to as "spindle axis") driven by a spindle motor, can only be adjusted by means of the above-mentioned trial and error method where a machined contour shape which has been obtained by an actual machining is actually measured to obtain the contour shape.

In a method for measuring a workpiece directly, skill for measurement and cost for a measuring device are required and an error in measurement may occur in some cases. Furthermore, even when the measured results are evaluated, such results must be input, which results in time and labor consuming work. Also, in order to establish final control parameters, machining must be repeated according to the method of trial and error, which results in much time consuming and using workpieces wastefully.

OBJECT AND SUMMARY OF THE INVENTION

An object of the present invention is to provide a controller which synchronously controls a servo motor and a spindle motor to machine a contour shape and which can automatically output the machined result obtained by contour machining for evaluation of the result.

In order to achieve the above object, a controller according to the present invention comprises collecting means which takes in positional data of a servo axis and positional data of a spindle axis at the same timing for each predetermined cycle, storing means for storing the positional data of the servo axis and the positional data of the spindle axis collected by the collecting means, and converting means which converts the collected positional data to obtain machining shape data. The machining shape data obtained by the converting means may be displayed on a display device of the controller or on a display device connected to the controller, or may be printed by a printer connected to the controller.

Also, a machining contour shape obtained from the machining shape data and a contour shape outputted from a instruction program or a reference contour shape set in advance can be displayed or printed for comparison with each other to find discrepancies between them so that the machining contour shape can be evaluated.

According to the present invention, when a contour machining is performed by controlling a servo axis which is linearly driven and a spindle axis which is rotationally driven synchronously, a machining contour shape can be displayed or printed automatically. Therefore, the machined result can be outputted and evaluated automatically without conducting measurement work of a workpiece obtained by the contour machining.

An evaluation based upon an actual machining is a much time-consuming work which requires process such as preparation of workpiece and tools, coarse machining or finishing machining, and process such as mounting work to a measuring instrument, measurement, output of measurement result, and the like. On the other hand, according to the present invention, evaluation of an error in shape can be made without conducting an actual machining in such a manner as described above, and it is made possible to conduct rapid adjustment of control parameters based on the evaluation result.

Also, since the shape data can be obtained from a controller or a personal computer, adjustment of control parameters of the controller can be made automatically based on evaluation result.

BRIEF DESCRIPTION OF THE DRAWINGS

The above and other objects-and features of the present invention will be apparent from explanation of the following embodiments with reference to the accompanying drawings, in which.

DETAILED DESCRIPTION OF THE PREFERRED EMBODIMENTS

A controller according to the present invention can assume three embodiments (or three hardware configurations) according to where a servo CPU for controlling a servo axis and a spindle CPU for controlling a spindle axis should be provided, respectively. Respective embodiments will be explained below with reference to the drawings.

Figure 1:
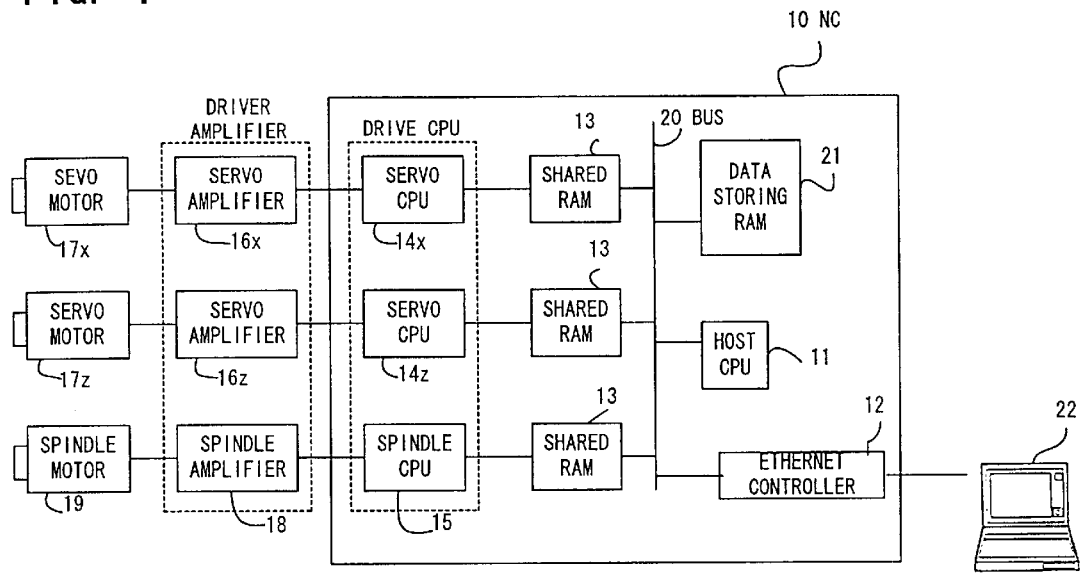
FIG. 1 is a block diagram showing a hardware configuration of a first embodiment of a controller according to the present invention, where a servo CPU and a spindle CPU exist inside a controller (CNC)

FIG. 1 shows a controller according to a first embodiment. In this embodiment, as shown in FIG. 1, both a servo CPU and a spindle CPU exist in the controller.

Reference numeral 10 denotes a controller (CNC apparatus) in which a host CPU 11 for controlling the entire CNC apparatus is built. Movement instructions to respective servo axes and a spindle axis, which are computed by the host CPU 11 based on an instruction machining program, are delivered to servo CPUs 14x, 14z and a spindle CPU 15 via shared RAMs 13.

The servo CPUs 14x, 14z performs positional control based on differences between positions detected by detectors mounted on servo motors 17x, 17z and instruction positions to generate a speed instruction. An instruction delivered from the servo CPUs 14x, 14z to servo amplifiers 16x, 16z may take the form of any one of a speed instruction, a current instruction and a PWM instruction (voltage instruction). The servo amplifiers 16x, 16z perform controlling based on the instructions from the servo CPUs 14x, 14z to drive the servo motors 17x, 17z.

Also, the example shown in FIG. 1 is configured such that the positions of the servo motors 17x, 17z are detected by the detectors mounted on the servo motors 17x, 17z and the detected positions are fed back to the servo CPUs 14x, 14z as the positions of the servo axes. However, in a full closed system where positions of mechanically movable portions are directly detected, positions detected by scales mounted on the mechanically movable portions are fed back to the servo CPUs 14x, 14z as the positions of machines.

In FIG. 1, regarding the spindle axis, like the case of the servo axes, the spindle CPU 15 performs positional control based on an instruction position and a position of a motor detected by a detector mounted on the spindle motor 19 or the position of the main shaft (hereinafter, the position of a motor or the position of the main shaft is referred to as "spindle axis position") detected by a position detector mounted outside the motor. An instruction issued from the spindle CPU 15 to the spindle amplifier 18 may take the form of any one of a speed instruction, a current instruction and a PWM instruction like the case of the servo axes.

The control of the servo axes and the control of the spindle axis are performed in a time-synchronous manner according to synchronization signals in the CNC apparatus. Also, the servo CPUs 14x, 14z and the spindle CPU 15 has position information at a specific time of the servo axes and the spindle axis. Therefore, the servo CPUs 14x, 14z and the spindle CPU 15 output these position information to the shared RAMs 13 for each cycle determined according to the synchronization signal. Furthermore, the host CPU 11 reads out these information via a bus 20 to store them in the data storing RAM 21 sequentially.

When predetermined data is stored in the data storing RAM 21, the host CPU 11 reads out data in the data storing RAM 21 to output it to the personal computer 22 as serial data via the Ethernet controller 12, in the case of FIG. 1, and to display shape data on a display device on the personal computer 22. In FIG. 1, the personal computer 22 is utilized as the display device, but a display device dedicated to the CNC apparatus may be used in this invention.

Figure 2:
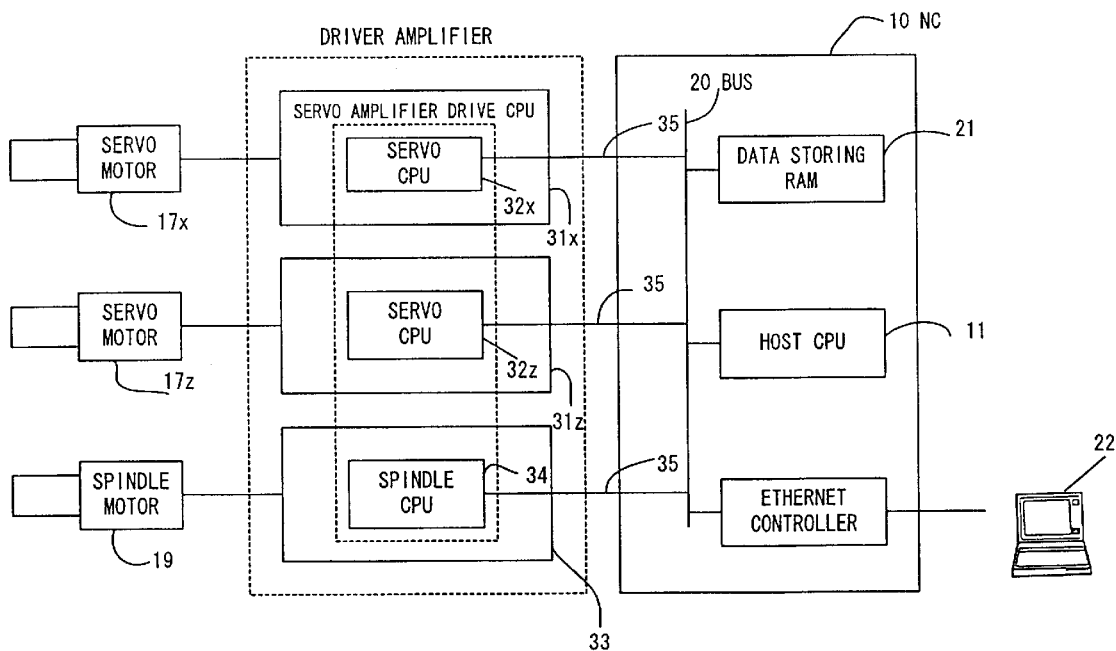
FIG. 2 is a block diagram showing a hardware configuration of a second embodiment of a controller according to the present invention, where a servo CPU and a spindle CPU exist in a servo amplifier and a spindle amplifier, respectively.

FIG. 2 shows a controller according to a second embodiment. In this embodiment, servo CPUs 32x, 32z exist in serve amplifiers 31x, 31z, and a spindle CPU 34 exists in a spindle amplifier 33, as shown in FIG. 2.

The process up to the stage where the instructions to the servo axes and the spindle axis are computed by the host CPU 11 based on the instruction machining program is similar to the first embodiment shown in FIG. 1. In FIG. 2, however, the instruction position data is delivered to the servo CPUs 32x, 32z and the spindle CPU 34 from the CNC 10 via a serial communication bus 35.

The servo CPUs 32x, 32z performs position, speed and current control of the servo motors 17x, 17z based on position instructions from the CNC apparatus 10, position/speed information detected by detectors mounted on the servo motors 17x, 17z or detectors provided on mechanically movable portions and fed back, and feedback information on real currents detected in the servo amplifiers 31x, 31z, and drive the servo motors 17x, 17z.

The spindle CPU 34 also performs position, speed and current control of the spindle motor 19 based on a position instruction from the CNC apparatus 10, position/speed information detected by a detector mounted on the spindle motor 19 or a detector detecting a rotational position the main shaft to be fed back, and feedback information on actual current detected in the spindle amplifier 33, and drives the spindle motor 19.

Information owned by the servo CPUs 32x, 32z and the spindle CPU 34 are stored in the data storing RAM 21 via the serial communication bus 35 connecting the CNC apparatus 10 to the servo CPUs 32x, 32z and the spindle CPU 34 and the data bus 20 in the CNC apparatus 10. The process where the data stored are displayed on the personal computer 22 is similar to the operation shown in FIG. 1.

Figure 3:
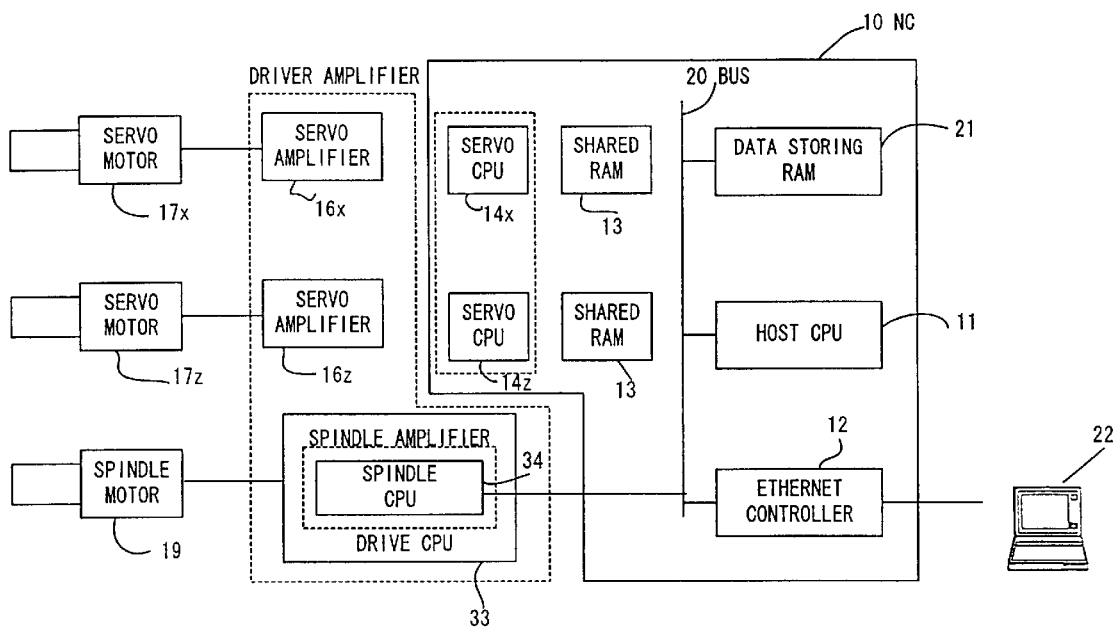
FIG. 3 is a block diagram showing a hardware configuration of a second embodiment of a controller according to the present invention, where a servo CPU exists in a CNC and a spindle CPU exists in a spindle amplifier.

FIG. 3 shows a controller according to a third embodiment. In this embodiment, servo CPUs 14x, 14z exist in the CNC apparatus 10, and a spindle CPU 34 exists in the spindle amplifier 33.

In this embodiment, the place where the servo CPUs 14x, 14z and the spindle CPU 34 exist is different from the cases shown in FIGS. 1 and 2, but this embodiment is similar to the first embodiment (FIG. 1) and the second embodiment (FIG. 2) in that data on the servo axes and data on the spindle axis can simultaneously be taken in the personal computer 22 by collecting data on respective axes in the data storing RAM 21.

Next, in the controller of the above first embodiment, the process where feedback data of the servo axes and the spindle axis is actually taken in to display a contour shape will be explained below. Incidentally, an example where a test program (one machining program) for evaluation is fed from the personal computer 22 and a request for taking in data is issued will be illustrated.

Figure 4:
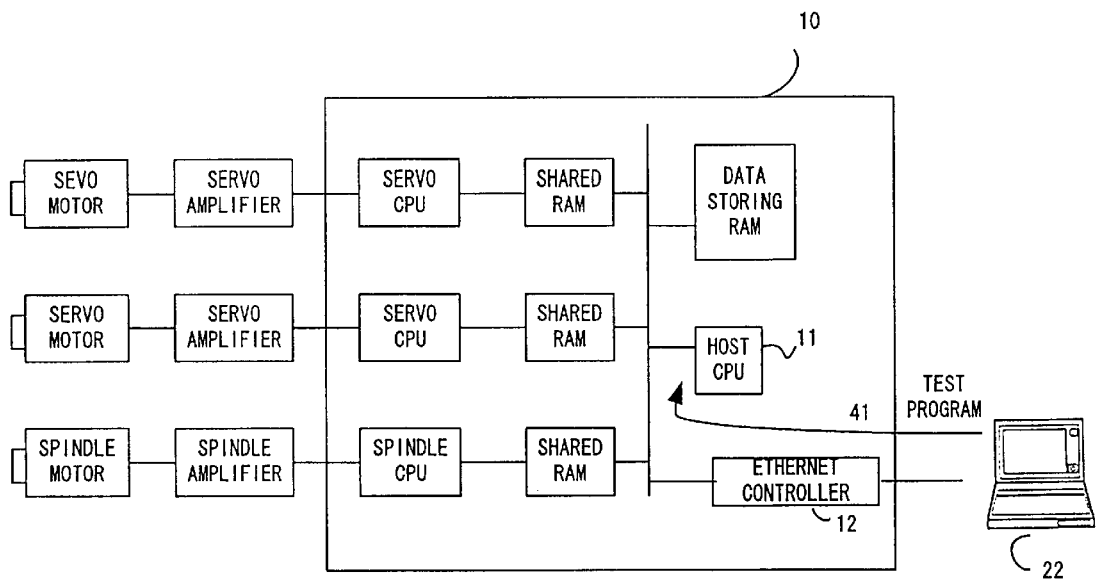
FIG. 4 is a block diagram showing a stage where a test program for shape evaluation is fed from a display device (personal computer) to the controller (CNC)

[First Stage (FIG. 4)]

The personal computer 22 delivers a test program 41 for shape evaluation regarding the servo axes and the spindle axis to the host CPU 11 of the CNC apparatus 10 via the Ethernet controller 12. This program is stored in a memory (not shown) of the CNC apparatus 10.

Figure 5:
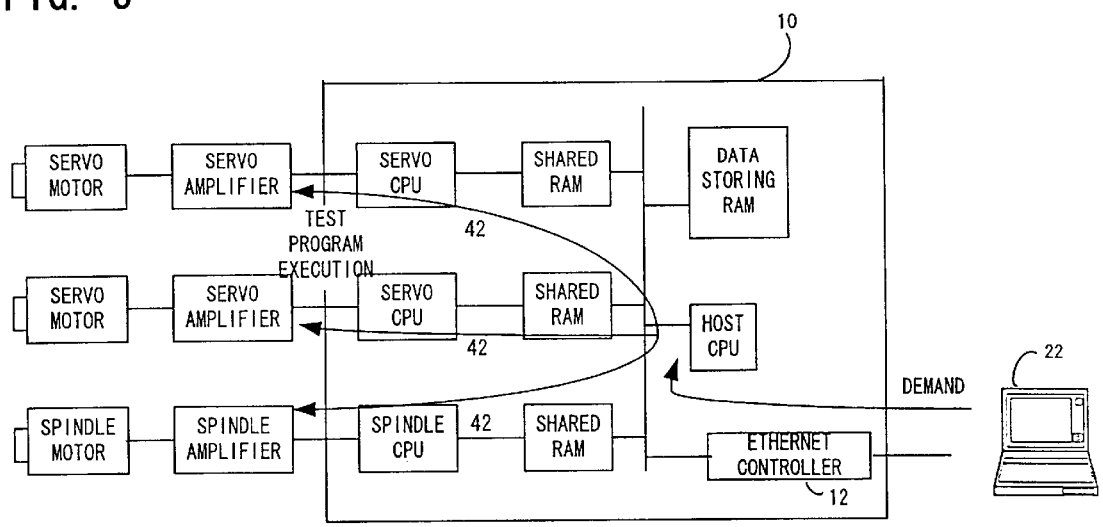
FIG. 5 is a block diagram showing a stage where a request for execution of a test program and a request for data storage are issued from a personal computer in the first embodiment.

[Second Stage (FIG. 5)]

The personal computer 22 outputs a request for taking in data about the servo axes and the spindle axis and a request for executing the test program 41 delivered in the first stage (FIG. 4) via the Ethernet controller 12.

The host CPU executes the test program 41 and outputs movement instructions (reference numeral 42 in FIG. 5) to the servo axes and the spindle axis via the shared RAMs 13. In this case, the servo motors and the spindle motor are driven and the machining program is executed, but a machining is not performed actually. Incidentally, an actual machining may be performed but, in a stage of adjustment of various control parameters, only a machining program is executed, namely, a so-called dry cut is performed, without performing an actual machining.

Figure 6:
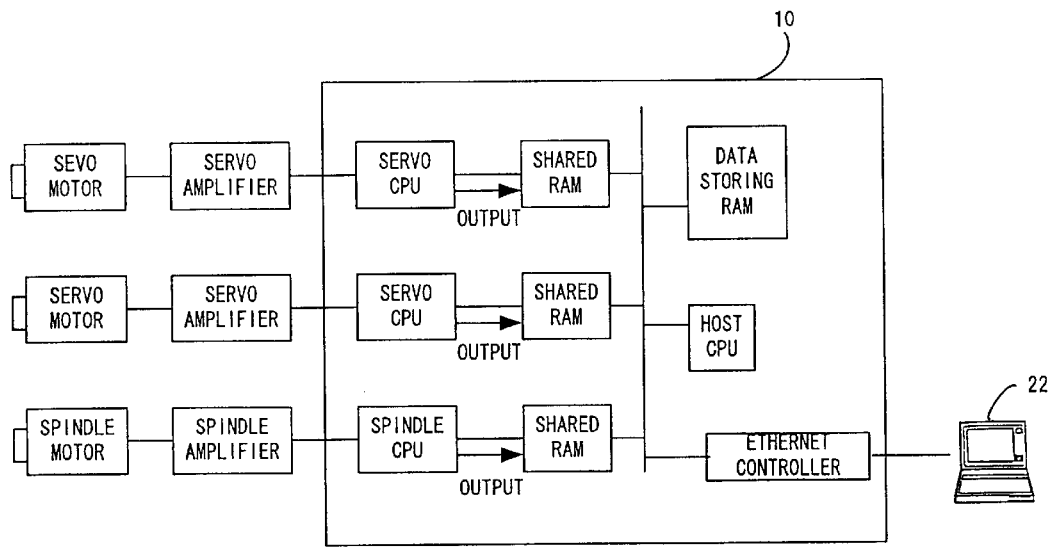
FIG. 6 is a block diagram showing a stage where feedback data is outputted to a shared RAM with the CNC from the servo CPU and the spindle CPU in the first embodiment.

[Third Stage (FIG. 6)]

The servo CPUs 14x, 14z and the spindle CPU 15 output feedback data to the shared RAMs 13 for each cycle. The servo CPUs 14x, 14z and the spindle CPU 15 outputs data at a timing coincident with a synchronization signal of the CNC apparatus 10 so that the data of the servo axes and the data of the spindle axis are synchronized with each other.

Figure 7:
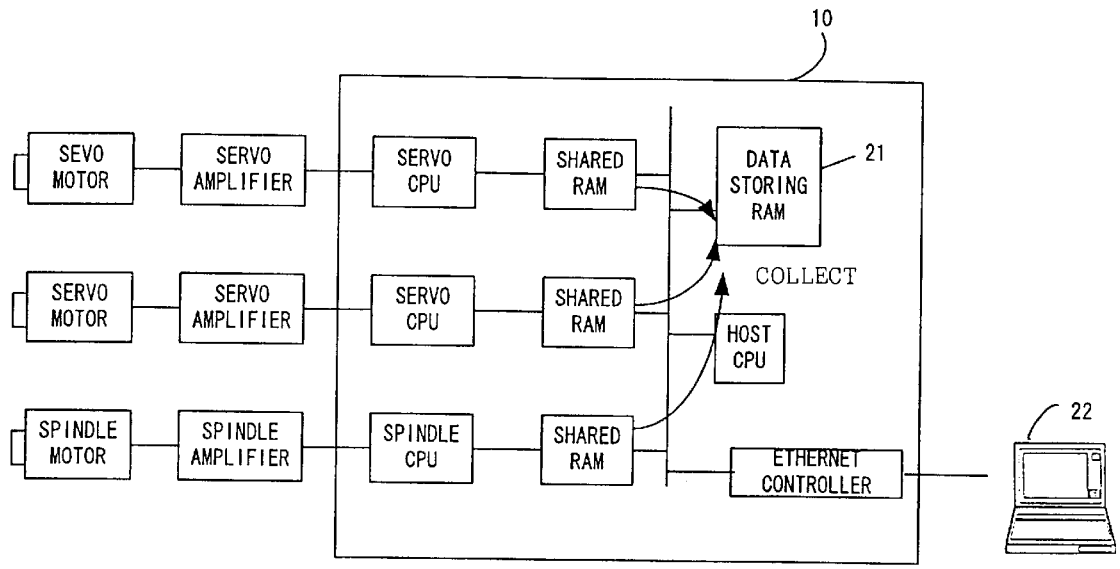
FIG. 7 is a block diagram showing a stage where a host CPU takes feedback data outputed from the servo CPU and the spindle CPU into a data storing RAM in the first embodiment.

[Fourth Stage (FIG. 7)]

The host CPU of the CNC apparatus 10 stores the feedback data on the servo axes and the spindle axis in the data storing RAM 21 via the bus 20.

[Fifth Stage (FIG. 8)]

Figure 8:
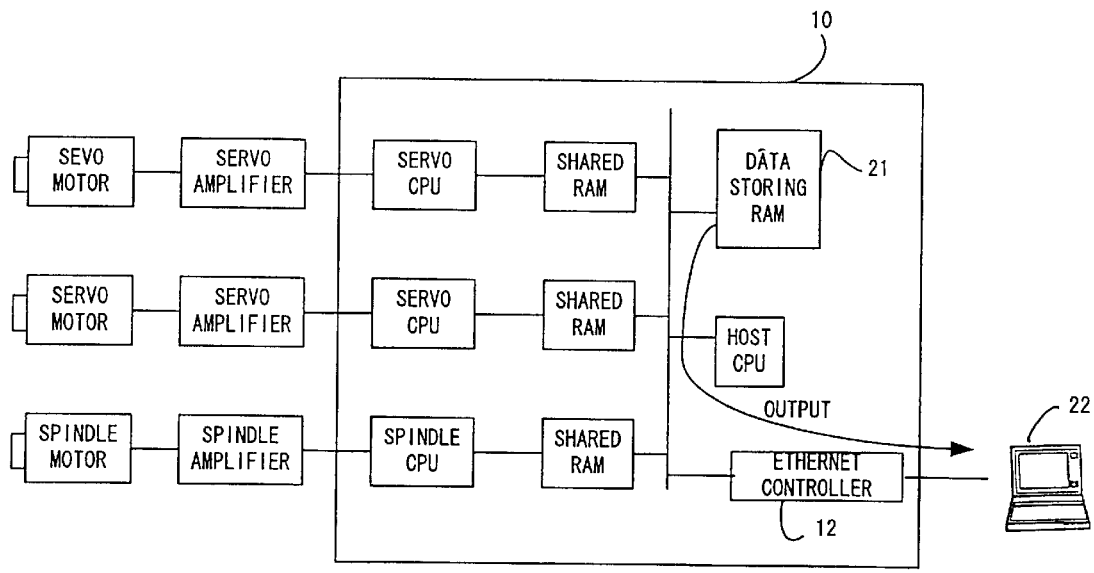
FIG. 8 is a block diagram showing a stage where the host CPU outputs data of the servo CPU and the spindle CPU stored in the data storing RAM to the display device via an Ethernet controller in the first embodiment.
Figure 9:
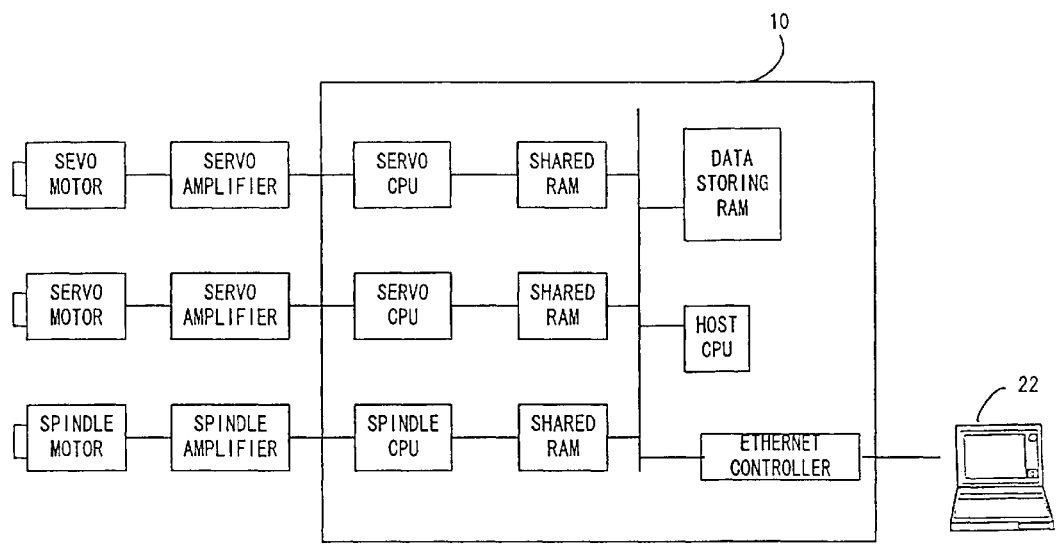
FIG. 9 is a block diagram showing a stage where the personal computer displays data of a servo axis and a spindle axis.

When a predetermined number of data are stored in the data storing RAM 21, the host CPU outputs the data to personal computer 22 via the Ethernet controller 12. These data are received in the personal computer 22 where shape data is displayed (FIG. 8).

In general, in case where a contour control is performed between the servo axes and the spindle axis, since the spindle axis is a rotating shaft and the servo axes are linearly moving shafts, a polar coordinate system is converted to a rectangular coordinate system to display a machining contour shape. Also, the machining contour shape is compared with a reference shape obtained and stored in advance according to the instruction program in the personal computer 22. In the personal computer 22, an error between the machining contour shape and the instruction program shape or the reference shape is also magnified and displayed for easy recognition of the error.

In the above examples, display device is a device of the personal computer 22, existing outside the CNC apparatus 10, however, as another example, the CNC apparatus 10 may have an exclusive display device inside so that a shape is displayed on the screen of the excusive display device by the host CPU. Further, a shape may be printed by a printer, instead of being displayed on a display device.

Figure 10:
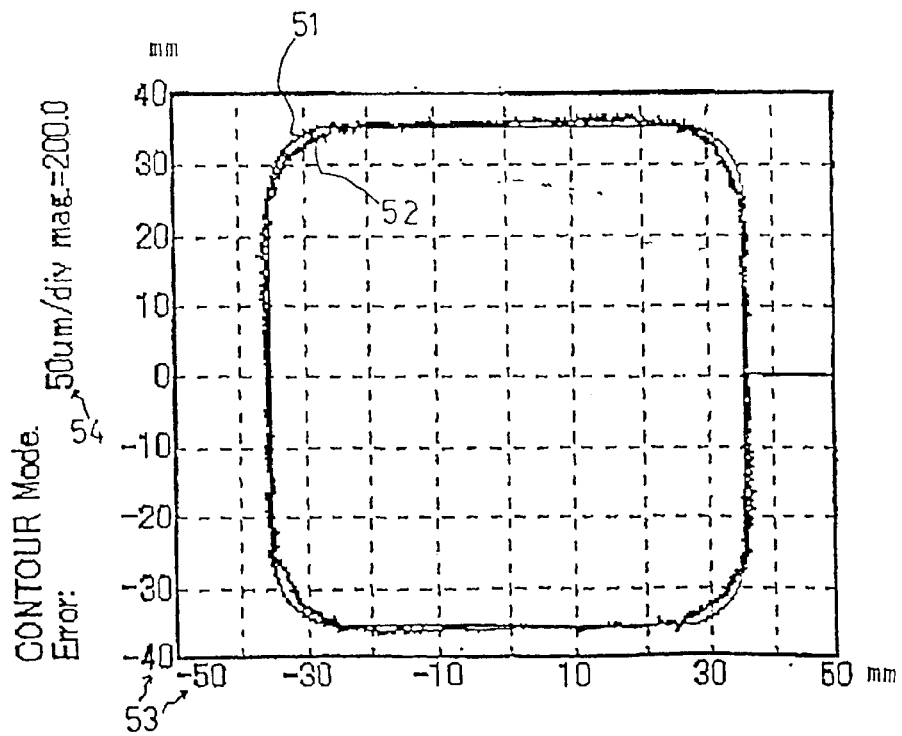
FIG. 10 is a graph where the result of contour operation of the servo axis and the spindle axis is taken in the display in which the result is compared with a programmed shape.

FIG. 10 shows an example of displaying an error in synchronization shape of the spindle axis and the servo spindle axes, according to the present invention.

The square shown in FIG. 10 has one side of 70 mm, and each corner is rounded with a radius of 5 mm. Reference numeral 51 denote a waveform of a program instruction shape, and reference numeral 53 denotes graduation lines (unit: mm) for the program shape. Also, reference numeral 52 denotes an error component which is displayed in a magnified manner. This error component to be displayed is obtained by converting the position feedback data of the servo axes and the spindle axis in a polar coordinate system to a shape in a rectangular coordinate system and then comparing the shape in a rectangular coordinate system with a program shape. Reference numeral 54 denotes a scale for the error component to be displayed (note that one division of the scale 54 for displaying such an error component is 50 μm, being 200 magnifications). With such a shape display, it is made possible to display a shape error to be occurred at a time of synchronization of the servo axes and the spindle axis, which could not be viewed from waveform measurement of only the servo axes or only the spindle axis.

As described above, according to the present invention, a machining contour shape can be obtained by a dry cut operation without performing an actual machining. Therefore, when various control parameters are established, the control parameters are adjusted based on the machining contour shape obtained by a dry cut operation. And then a dry cut operation is conducted again, and dry cut operations and adjustments of various control parameters are repeated until the various control parameters are determined to be optimal values. With these processes, various parameters can be determined.

Also, various control parameters may be readjusted based on a machining contour shape obtained by actual machining conducted using various control parameters finally determined by dry cut operations. In this case, the various control parameters whose optimal values have been determined by dry cut operations are parameters to be determined according to the characteristics of the control system. An adjustment of parameters, which is done based on a machined contour shape obtained by performing an actual machining using various control parameter determined a dry cut operation, is an adjustment of parameters due to factors other than control system, such as deflection of tools or a work or the like. Also, there is an advantage that the deflection of tools or a work or the like can be detected based on the machined contour shape thus obtained.

What is claimed is:

1. A controller which synchronously controls a servo axis driven by a servo motor and a spindle axis driven by a spindle motor to machine a predetermined contour shape, comprising:

collecting means which collects the position data of the servo axis and the position data of the spindle axis at the same timing for each predetermined cycle;

storing means which stores the position data of the servo axis and the spindle axis collected by the collecting means;

converting means which converts the position data of the servo axis and the spindle axis to obtain a machining shape data; and means which outputs the machining shape data obtained by the converting means.

2. The controller according to claim 1, wherein an instruction machining program is executed, without performing an actual machining, to obtain said machining shape data.

3. The controller according to claim 1, wherein the machining shape data is displayed on a display device of the controller or on a display device of a personal computer connected to the controller, or the machining shape data is printed by a printer, thereby allowing evaluation of the machining shape data.

4. A controller according to claim 3, further comprising instructed contour storing means which stores the instructed contour shape obtained based on an instructed machining program for machining the contour shape, wherein a machining contour shape obtained from the instructed contour shape and the machining shape data is displayed on the display device or printed by the printer, thereby allowing the machining contour shape to be evaluated by comparison.

5. The controller according to claim 3, wherein a reference contour shape storing means which stores a reference contour shape serving as a reference for the machining contour shape is provided in the controller or the personal computer, and the reference contour shape and a machining contour shape obtained from the machining shape data are displayed on the display device, thereby allowing evaluation of the machining contour shape.

6. The controller according to claim 1, wherein the converting means is provided in the personal computer.

* * * * *